March 31, 1959 R. H. DARK 2,880,031
TILE LAYING DEVICE
Filed June 8, 1956 2 Sheets-Sheet 1
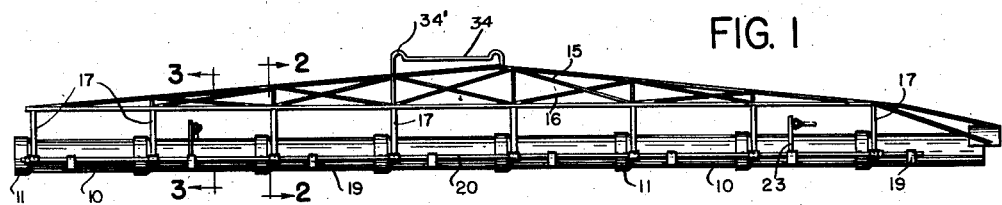
FIG. 1
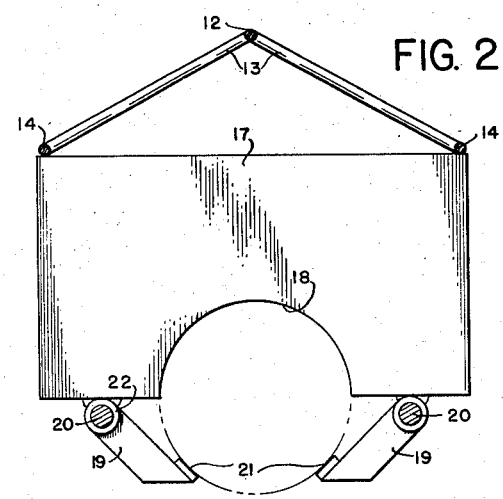
FIG. 2
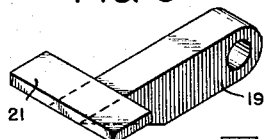
FIG. 5
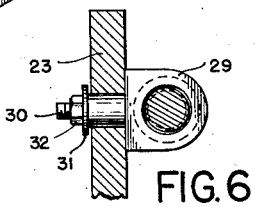
FIG. 6
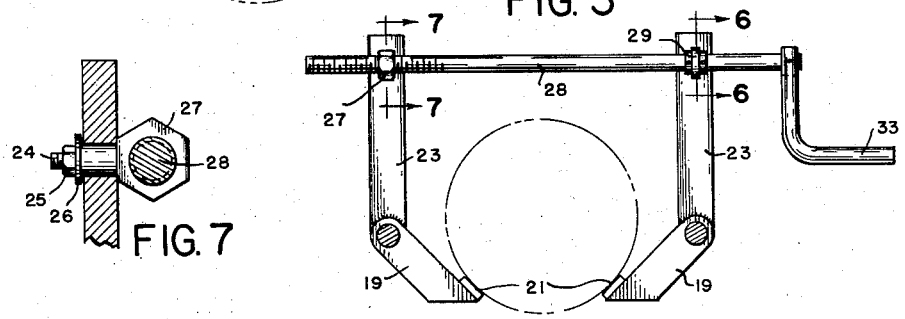
FIG. 3
FIG. 7
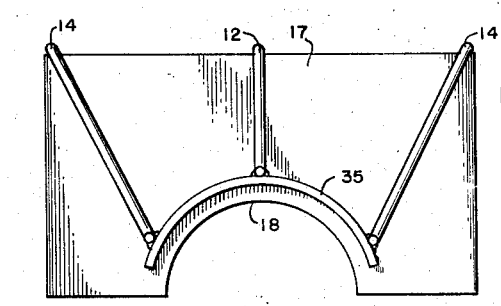
FIG. 4
INVENTOR
R.H. DARK
BY *Wyatt Dowell*
ATTORNEY

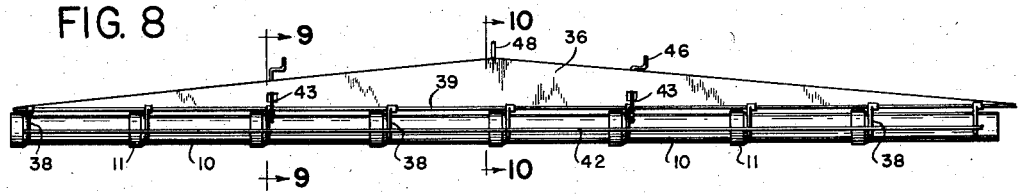
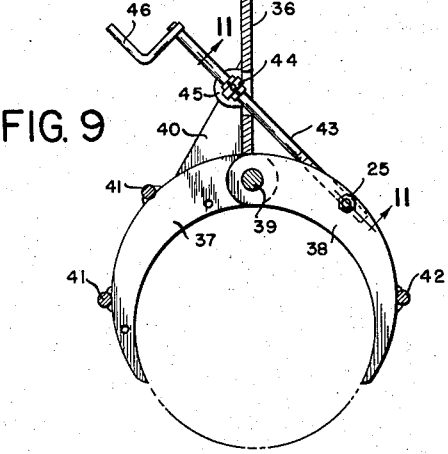
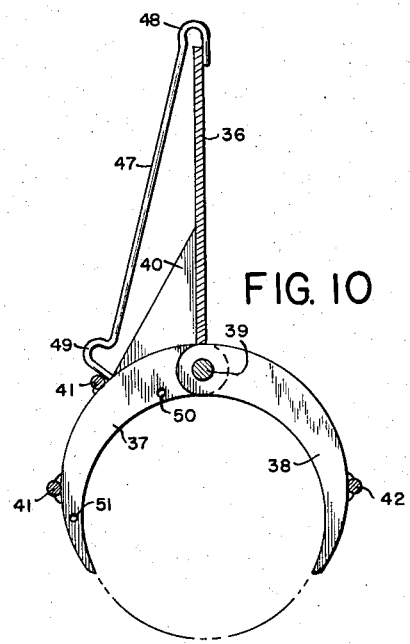
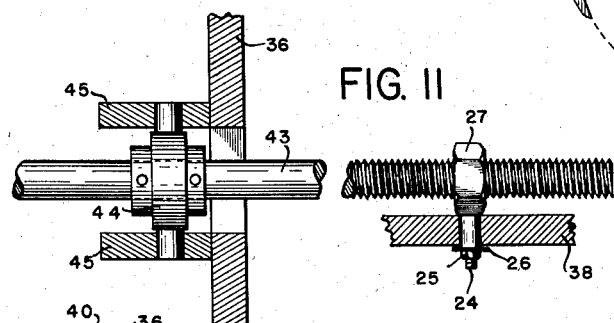
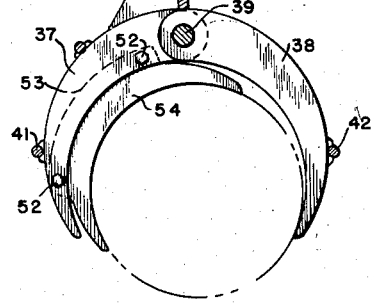

United States Patent Office 2,880,031
Patented Mar. 31, 1959

2,880,031

TILE LAYING DEVICE

Ralph H. Dark, Laramie, Wyo.

Application June 8, 1956, Serial No. 590,262

3 Claims. (Cl. 294—87)

This invention relates to fluid distribution whether in gaseous or liquid form but primarily in the latter state, and more particularly to conduits or pipes employed therein and to the manner of laying such pipes so that they are connected and the joints between them are closed or relatively tight.

The invention relates especially to the disposition of pipes or conduits in telescopic end-to-end axial alignment with their ends connected by bell and socket joints and closed by caulking material such as lead oakum or other substance, in hot or cold condition, and to the angularity at which such pipes are disposed to promote fluid and particularly liquid flow therethrough.

The laying of a series of pipes each having a flared mouth at the end in which the smaller end of an adjacent pipe is received and with the joint thus formed caulked or packed, is a tedious time-consuming operation and in view of the fact that the cost of labor has increased it has become highly desirable to find a way to reduce the time, labor and expense required in the laying of pipes or tiles.

It is an object of the invention to provide apparatus and method by which tiles may be more easily laid with less labor, in a shorter time, and at reduced costs and without interfering in the least with other operations in the same area.

Another object of the invention is to provide a tile laying apparatus or device and method by means of which a series of tiles may be joined together, their ends caulked or packed, and the series of tiles placed as a unit in position or location in association with other tiles or not, as the occasion demands.

A further object of the invention is a tile laying device in the form of a relatively straight support for holding a series of tiles in assembled end-to-end relation, and with hoisting equipment for standing such member on end or in substantially vertical position so that the flared ends of the pipes will be disposed upwardly so that lead or other form of caulking in molten or fluid condition can be poured into the substantially horizontally disposed cavity of the joint and after cooling and solidification of such material, the series of tiles can be lowered as a unit and placed at right angles in a substantially horizontal or inclined position.

Other objects and advantages of the invention will be apparent from the following description taken in conjunction with the accompanying drawings wherein:

Fig. 1 is a side elevation illustrating a tubular holder for a series of tiles;

Fig. 2, an enlarged transverse section on the line 2—2 of Fig. 1;

Fig. 3, a similar section viewed in the opposite direction and on the line 3—3 of Fig. 1;

Fig. 4, an enlarged end elevation of the tubular tile holder of Fig. 1;

Fig. 5, a detail perspective of one of the tubular tile engaging and supporting arms;

Fig. 6, a further enlarged section on the line 6—6 of Fig. 3;

Fig. 7, a further enlarged section on the line 7—7 of Fig. 3;

Fig. 8, a side elevation of a slightly modified tubular tile holder;

Fig. 9, an enlarged transverse section on the line 9—9 of Fig. 8;

Fig. 10, an enlarged transverse section taken on the line 10—10 of Fig. 8;

Fig. 11, a further enlarged section on the line 11—11 of Fig. 9; and

Fig. 12, a section similar to Fig. 9 illustrating clamping jaws with a size reducing adapter for use with tubular tiles of smaller external diameter.

Briefly stated, the invention comprises a holder for a group or series of tubular tiles having bell-type or flared mouths at one end of each, which holder can be picked up by a crane or other hoisting apparatus. The holder comprises a backbone or frame structure having longitudinally spaced depending pairs of arms. The arms of each pair engage opposite sides of a pipe so that a series of pipes are held and can be stood on end so that caulking material may gravitate into the joint and thereafter the unit of tiles can be lowered by hoisting apparatus into place along with other tiles to provide a pipe system, thereby saving time and expense in the laying of the same.

With continued reference to the drawings the device of the present invention is adapted to hold and support a series of pipes or tubular tiles each having a flared or enlarged end or bell mouth 11 into which the smaller end of an adjacent tile can be introduced.

In laying a series of tiles 10 it is necessary to determine that the tiles are in substantial alignment and in the proper telescopic relation. This operation has involved the laying of tiles one at a time, and after one tile is laid the next tile is laid and moved endwise into the proper telescopic relation, the proper angularity also being determined at the same time.

The present invention involves a holder in the form of a longitudinally disposed truss or top or superstructure having a top 12 connected by similarly disposed transverse members 13 and a pair of horizontal members 14, a series of longitudinal cross braces 15 and 16 being employed for added strength and rigidity.

To the truss thus described and particularly the horizontal members 14 are attached a series of vertically disposed transverse abutment plates 17 having curved substantially semi-circular openings 18 in their lower edges, the size and curvature of such openings corresponding to the surface curvature or configuration of the exterior of the tubular tiles which are adapted to be handled.

The plates 17 are spaced apart longitudinally of the tiles a distance corresponding substantially to the exposed portion of a tile disposed in sequence with a series of other tiles so that a series of such tiles are engaged, one by each of said plates 17, and maintained in a substantially straight line.

In order to retain the tiles in the substantially similar openings 18 in the plates 17, a pair of transversely disposed tile supporting arms 19 are mounted on longitudinal rod pivots 20 and are provided with tile-engaging portions such as pads 21, there being one of such arms 19 adjacent each side of each tile near the end of the curved opening 18 of the plate 17. Thus when a tile is within the curved opening 18 and the adjacent arms 19 are swung toward each other, as illustrated in Fig. 1, and held in such position, such tile can be maintained in place. The pivots 20 are longitudinaly disposed rods mounted in bearings 22 attached to the lower edges of the plate 17.

The arms 19 are capable of being moved toward and from each other due to the fact that each is supported by an upright 23 to which it is attached since the uprights 23 are adjusted toward and away from each other as will subsequently be described. Through such upright there extends a bolt 24 having a nut 25 on its threaded end bearing against a washer 26, such bolt having on its opposite end a nut or threaded member 27 which engages an externally threaded rod or shaft 28 slideable in a bearing 29. A bolt 30 extends through an opposed arm 23 and against the opposite side of which the bearing 29 is engaged, being held in place by a nut 32 bearing against washer 31. A crank 33 is fixed to the shaft 28 so that the shaft may be rotated to move and adjust the arms 23 and thereby move arms 19 toward and from each other.

Due to the structure of the holder just described a series of tiles can be supported as a unit in the proper aligned relation and can be moved into position with a minimum of effort and without disconnecting them or disturbing the joints between them. With the tiles thus assembled, the holder may be picked up by its bracket 34 by means of a lifting device of any design or character such as a crane or the like and the series of aligned tiles can be moved until the flared ends are in substantially horizontal upwardly open position whereupon the joint can be filled. After the assembly of the series is complete the bracket 34 may again be engaged by lowering mechanism and the bracket 34 is provided with a curved portion at each end so that in laying the tiles the curved portion adjacent the already laid tiles can be engaged to cause the tiles to move longitudinally.

In order to cause the unit of tiles to move into aligned engagement with other tiles already laid, an end plate 17 is provided with a curved member 35 substantially semi-circular in shape and of an external configuration corresponding to that of the respective tile.

In lieu of the truss structure previously described a truss of a different character may be employed, for example one having a plate or backbone 36 adapted to be vertically disposed; such plate 36 decreasing in width from near its center to its respective ends. To this plate, which is adapted to be disposed longitudinally of a series of aligned assembled tiles, a series of spaced clamps are secured each comprising a fixed jaw 37 and a movable jaw 38 connected by a pivot 39 in the form of a longitudinally disposed rod.

The fixed jaws 37 are mounted on brackets 40 and are connected by tie rods 41. The pivoted jaws 38 are connected to adjusting screws 43 by joints such as that illustrated in Figs. 7 and 11 and the screws 43 likewise are mounted in bearings 44 on ears 45 attached to the longitudinal plate 36.

A crank 46 is fixed to the screw 43 for rotating the same to swing the movable jaws toward the fixed jaws for engaging the tiles, a pair of such jaws 37 and 38 being mounted along the plate 36 for each tile intended to be supported.

In order to facilitate the handling of the tile holder of the present invention a bracket 47 is provided having its upper end attached centrally to the upper edge of the plate 36 and its lower end attached to the central stationary jaw 37, such bracket having hoisting hook portions 48 and 49. In use the holder is supported by the hoisting hook in the curved portion 48 for lowering the group of pipes or tiles into place and thereafter the hoisting hook is shifted to the portion 49, which, on account of its location will permit the jaw 37 to be moved away from the jaw 38 to release the pipes or tiles.

In order to enlarge the usefulness of the holder so that pipes or tiles of different sizes may be handled the fixed jaw 37 is provided with a pair of bolt holes 50 and 51 for the reception of bolts 52 (Fig. 12) which bolts are adapted to extend through a flange 53 of a curved substantially crescent shape adaptor plate 54 of the desired thickness to accommodate pipes or other objects of different sizes.

Thus, there is provided a holder for a group of pipes or tubular members disposed in end-to-end relation which can be used for handling the same in a group or as a unit thereby facilitating the laying of pipe and with such improvement reflected in the time consumed and the cost involved.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A tile laying device for laying a series of axially aligned tile including annular bell portions comprising a holder, said holder comprising an elongated truss member which supports a series of longitudinally spaced transverse tile engaging members, said members being formed by the downward extension of two transversely spaced arms mounted on the truss at their upper ends and at their lower ends extending inwardly toward the opposite arm, said arms terminating in spaced relation, a series of abutment means spaced adjacent to the tile engaging arms and extending downwardly from the truss for limiting the upward movement of the tiles and engageable with the bell portion of the tile, means mounted on said holder to operatively move the tile engaging arms to an outward position to enable the arms to traverse the longitudinal axis of a tile member and to an inward tile engaging position to hold the tile firmly against the abutment means, the transverse tile engaging members being spaced at effective longitudinal increments along the truss member for engaging with each of a series of tile and hold them in assembled relationship, and attachment means centrally of the truss for attachment of the lifting means, said attachment means extending longitudinally of the truss and to one side of the midpoint thereof for permitting said lifting means to be positioned at one point therealong.

2. A tile laying device as set forth in claim 1 in which said abutment means comprises longitudinally spaced plates depending from said truss and including aligned downwardly open arcuate portions for conforming to the outer surface of the tile being handled and abuttingly engaging the annular bell portions of an adjacent tile.

3. A tile laying device as set forth in claim 1 in which said attachment means comprises an elongated bracket secured longitudinally of said truss and providing a longitudinal slot thereabove, said bracket including longitudinally spaced hook engaging portions communicating with the longitudinal slot formed thereby, one of said hook engaging portions is located at the center of gravity of said truss member with respect to the longitudinal axis thereof and said other hook engaging portion is offset from the longitudinal axis of said truss spaced from the center of gravity thereof for facilitating the horizontal and vertical disposition of the series of tile being handled.

References Cited in the file of this patent

UNITED STATES PATENTS

| | | |
|---|---|---|
| 905,010 | Simmons | Nov. 24, 1908 |
| 1,260,685 | King et al. | Mar. 26, 1918 |
| 1,877,974 | Robb | Sept. 20, 1932 |
| 2,429,193 | Pool et al. | Oct. 14, 1947 |
| 2,507,368 | Carlson | May 9, 1950 |
| 2,520,815 | Shaboo | Aug. 29, 1950 |
| 2,571,832 | Chapin | Oct. 16, 1951 |
| 2,597,760 | Strahm | May 20, 1952 |
| 2,692,159 | Croswell et al. | Oct. 19, 1954 |
| 2,706,060 | Ferrario et al. | Apr. 12, 1955 |
| 2,718,426 | Nagy | Sept. 20, 1955 |